Oct. 8, 1935.  W. DÄLLENBACH  2,016,628
DIRECT CURRENT CONVERTER
Filed Feb. 10, 1933  2 Sheets-Sheet 1

Inventor:
Walter Dällenbach
Attorney:

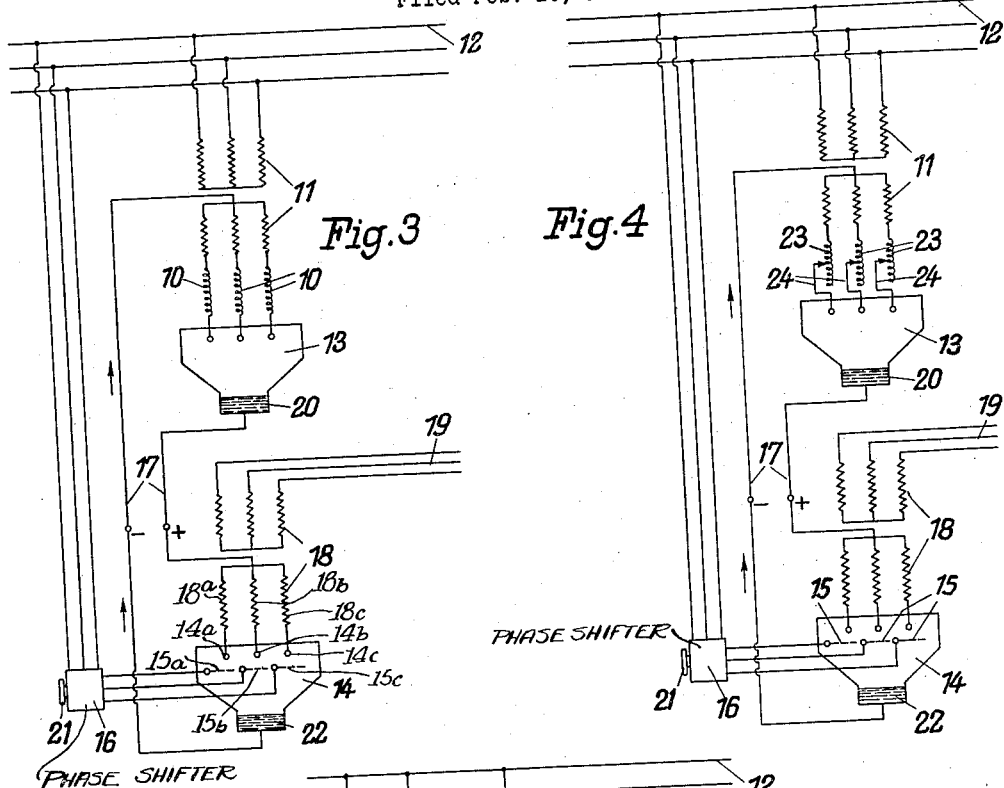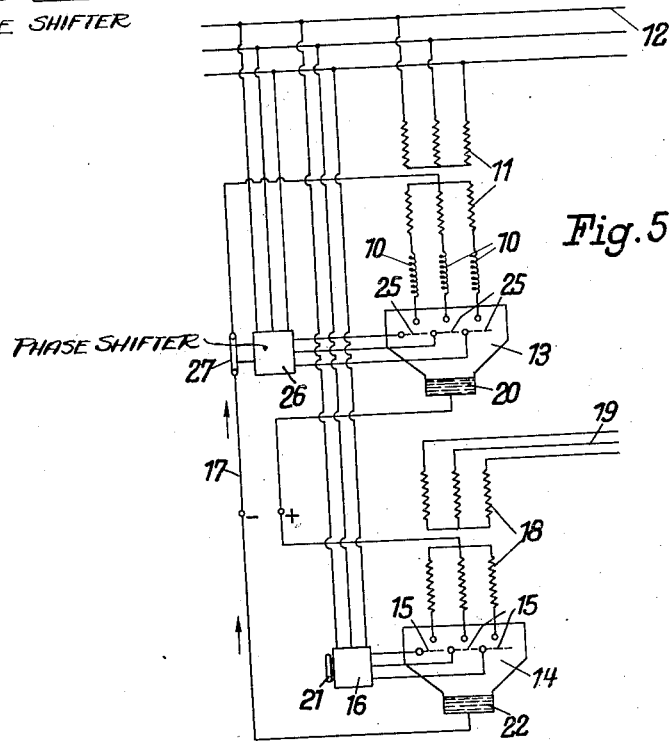

Patented Oct. 8, 1935

2,016,628

UNITED STATES PATENT OFFICE 2,016,628

DIRECT CURRENT CONVERTER

Walter Dällenbach, Berlin-Charlottenburg, Germany

Application February 10, 1933, Serial No. 656,180
In Germany February 10, 1932

7 Claims. (Cl. 171—97)

My invention relates to an arrangement for converting direct current into alternating current by means of grid-controlled discharge vessels functioning as inverters. The said vessels may be filled with gas or vapour, may have a mercury or hot cathode and may be of any desired phase number and type.

For a better understanding of the essential features of my invention, the theoretical principles which here come into consideration will first be discussed.

The direct voltage provided by a mercury vapour rectifier diminishes with increasing load until it reaches about zero, chiefly because of the stray reactances in the alternating current circuit. If the ignition point of the anode currents is retarded by control grids, and such retardation is kept constant with increasing load, the external characteristic of the rectifier is shifted substantially parallel to itself towards lower values of the voltage.

Fig. 3 is a circuit diagram illustrating one form of my invention.

Fig. 4 is a circuit diagram illustrating a modification.

Fig. 5 is a circuit diagram illustrating another form.

The conditions mentioned above are shown in Figure 1 of the accompanying drawings where G is the direct current voltage on the D. C. side of the rectifier and J is the direct current. The normal external characteristic of the rectifier installation is shown at 1, while at 2 is shown the characteristic, which is shifted substantially parallel to itself towards lower values of the potential and which is obtained from 1 when the ignition point of the anode currents is retarded electrically by a certain phase angle. If the retardation of ignition is made greater and greater, for instance when the rectifier is under no-load operation, a point will be reached when both the direct current and the voltage of the rectifier will be zero. If a reversed or counter E. M. F. be provided in the direct current circuit, the back E. M. F. of reversed polarity, on further increasing the retardation of ignition, may be increased to a value which is equal and opposite to the no-load voltage of the device when acting as a rectifier. From the moment of reversal of the polarity, the rectifier functions as an inverter and now supplies energy to the alternating current circuit. The back E. M. F. can at the most be raised to a value $-G_0$, where $G_0$ is the no-load voltage during normal rectifier operation without control grids. The question now arises, up to what direct current values is it possible to load the rectifier in the region in which it functions as an inverter?

Figure 1:
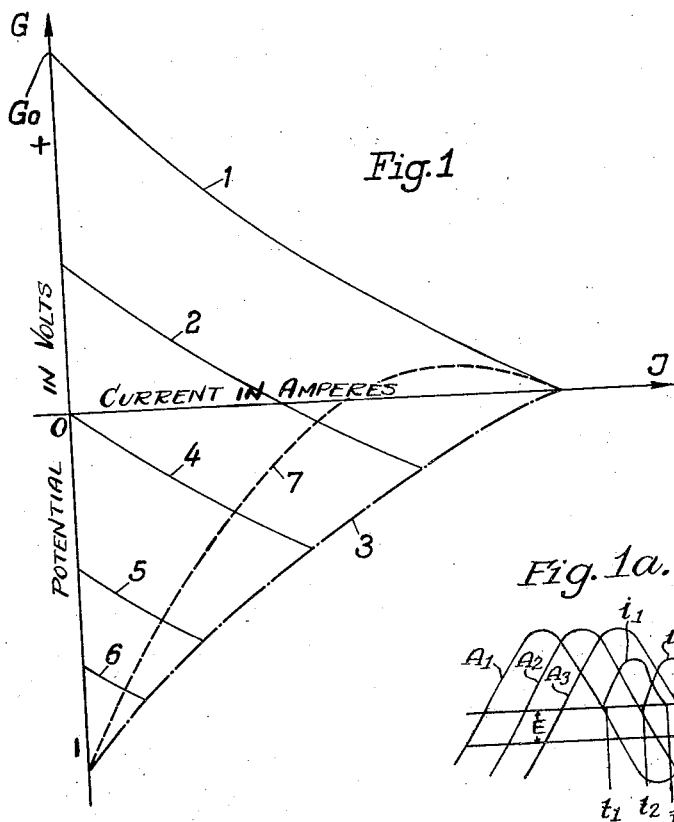
Fig. 1 is a graphic representation of the characteristics of an inverter.

Mathematical analysis shows that the characteristic which is obtained under the influence of a predetermined constant retardation of ignition holds good as far as the limit 3 shown in dot-and-dash line in Figure 1. This limit has been found with a good degree of accuracy to be the mirror image of the characteristic 1 relatively to the current axis J as mirror axis. It is called the step limit, because if an attempt is made to load the device beyond this limit, the apparatus is over-controlled and falls out of step like a synchronous machine owing to the formation of internal short circuits.

These statements cover the entire range of possible cases of loading which is attainable with a controlled rectifier. 2, 4, 5 and 6 are characteristics which are all produced from the characteristic 1 by substantially parallel shifting and by increasing the retardation of ignition in each instance. Each of these characteristics corresponds to possible loading conditions only before attaining its point of intersection with the limit 3. If an attempt is made to carry the loading beyond this limit line 3, the device will fall out of step. This phenomenon may be explained as follows:

In Figure 1 let E be the back E. M. F. impressed in the direct current circuit during inverter operation; this voltage E does not by any means fix the condition of the inverter, but according to the condition of the grid control, it provides an entire choice of possible loading conditions which are shown in the diagram by the points of intersection of the characteristics 2, 4, 5, with the line of the voltage E. The characteristic 2 corresponds to the minimum retardation of ignition, and the characteristic 5 to the maximum retardation of ignition. If, now, the retardation of ignition is so regulated that the condition of the inverter moves from the characteristic 2 through the characteristic 4 to the characteristic 5, the intensity of the current flowing through it diminishes from the value $J_2$, which is the maximum possible with the voltage E, to $J_4$ and finally to $J_5=0$, that is to say, the characteristic 2 corresponds to the condition in which the inverter is just situated on the theoretical "step limit". The characteristic 4 corresponds to a mean possible load $J_4$, the characteristic 5 corresponds to the case in which the voltage E appears as the no-load voltage of the inverter. If, now, this voltage E is increased, the case arises that E assumes just the value $-G_0$, $G_0$ being the no-load voltage of the rectifier. This voltage $E = -G_0$ is only possible for quite a definite control of the grids, namely, a control of the grids in which the load for attaining the step limit coincides with no load, that is to say, a condition of loading which cannot be realized in practice.

Figure 1A:
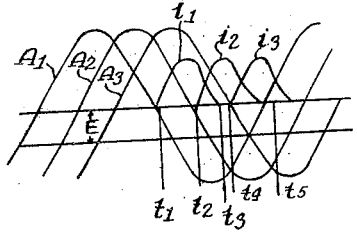
Fig. 1a is a graphic representation of the instantaneous values of the alternating current voltages applied to three successive inverter anodes.

Referring now to Figure 1a, let $A_1$, $A_2$, and $A_3$ represent the instantaneous values of the alternating current voltages applied to three successive inverter anodes I, II and III, and E represents the direct current voltage supplied to the inverter by the rectifier. Let the control grids of the anode I be released at the point of $t_1$. Since the instantaneous voltage $A_1$ at this point is smaller than the direct current voltage E, a current $i_1$ begins to flow in the circuit of anode I. At the moment $t_2$, which for example in case of a 6-phase inverter lags by $2/6\pi = 60°$ behind $t_1$, the potential of the grid coresponding to the anode II is changed to a positive value and the anode II ignites. At this moment the grid of anode I is changed to a negative value, thus causing the current $i_1$ gradually to diminish to zero at the moment of time $t_3$, while the current $i_2$ gradually increases. As soon as the current $i_1$ has died away, the control grid of the anode I, being negative, again comes into operation and prevents the anode I from igniting again at the moment $t_4$, at which time the potential of the grid corresponding to the anode III is changed to a positive value, and this anode is ignited. The current $i_3$ starts to flow through the anode III at the moment $t_4$ simultaneously as the potential of the grid corresponding to the anode II is changed to a negative value and the load current is shifted gradually from the anode II to the anode III. If the anode I were to ignite at the moment $t_4$, a complete short circuit would result therefrom in which suddenly the full positive half-wave of the anode I would operate in the same sense as the back E. M. F. E and produce an internal short circuit of the inverter. This case would occur if, with increasing load, that is to say, with increasingly delayed moment of extinction $t_3$ of the current $i_1$, the said moment of extinction $t_3$ of the current in anode I finally occurred at the time $t_4$. This currentless interval between $t_3$ and $t_4$, in the anode I is absolutely necessary for restoring the stopping action of the grid corresponding to this anode, so that the stopping action of the grid would not set in again and the above-mentioned short circuit of the inverter would occur. The load for which the moment of time $t_3 = t_4$ corresponds in Figure 1 to the direct current $J_3$, at which the working point on the horizontal line E just attains the "step limit".

In actual practice, it is impossible to approach the limit 3, since the control grids already cease to function properly upon a higher limit, line 7 being attained. This is due to the finite time of de-ionization, which prevents the control grids becoming instantly operative again after the extinction of the arc current. Such control of the grids as would tend to cause the working condition to be represented by a point beyond the curve 7 will be called "over-control". The region of conditions between the curves 1 and 7 and above the axis J corresponds to all the conditions of the apparatus as a rectifier, while the region between the axis J and the curve 7 below the axis corresponds to the conditions as an inverter. The curve 7 may be termed the "true step limit".

Figure 2:
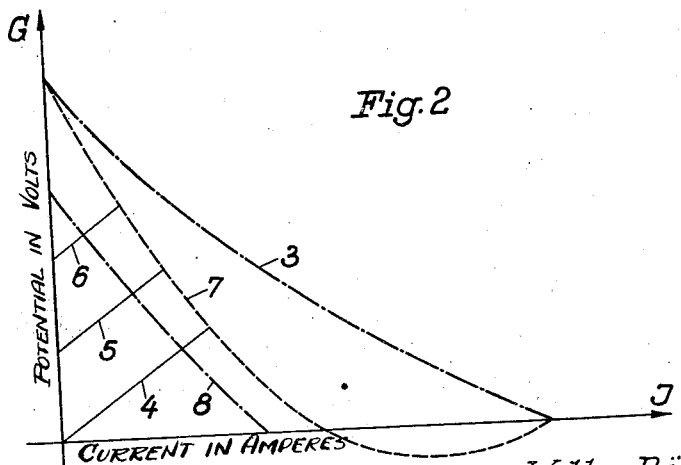
Fig. 2 is a graphic showing of the characteristics of an inverter but with a change in sign of the voltage.

Figure 2 again shows the characteristics for the inverter, but with change in sign of the voltage. The direct voltage G feeding the inverter has been plotted as positive voltage. 4, 5, 6 are three characteristics for different ignition retardations. 3 is the step limit as calculated mathematically, without taking into consideration the finite time of de-ionization, and 7 is the real step limit.

If, now, an inverter of the present type is fed from a direct current network, there is a simple and reliable means of preventing the apparatus from coming out of step, even when there is overcontrol of the grids. It is merely necessary to impart to the device feeding the direct current circuit an external characteristic, for example curve 8, which extends below the step limit 7 of the inverter. This external characteristic then renders it impossible, in the event of over-control of the inverter, for conditions in the immediate vicinity of the step limit to be attained.

Accordingly, the object of the invention is to provide an arrangement for the conversion of direct current into alternating current by means of controlled, gas or vapour filled discharge vessels functioning as inverters, and the characteristic feature of the invention consists in arranging that the external characteristic of the device feeding the direct current circuit shall extend below the step limit of the inverter in at least a part of the possible range of loads between no-load and short-circuit.

A particularly important instance of the use of this arrangement occurs in the frequency-independent coupling of two alternating current networks by means of a rectifier and an inverter.

In this case, 8 is the external characteristic of the rectifier fed from the primary alternating current network, while, 4, 5, 6 are characteristics of the inverter fed by the rectifier, and 7 is the step limit of the latter.

Particularly favourable conditions are obtained when the external characteristic 8 of the rectifier feeding the intermediate direct current circuit extends below the true step limit 7 of the inverter in the entire range of loads from no-load to short-circuit.

The external characteristic may be influenced in any desired manner. The external characteristic of a direct current circuit is influenced in known manner by the choice of the no-load voltage of the device feeding the direct circuit and by means of resistances in which, during load, there occurs a drop in voltage which reduces the direct voltage with increasing load. If the direct current is supplied for example by means of rectifiers connected to an alternating current network, the alternating voltage during no-load and the reactances of the alternating current circuit are so selected that the external characteristic of the direct current circuit is adapted in the desired manner to the true step limit of the inverter. In the case of a controlled rectifier as source of direct current, the adaptation may also be attained by means of the control grids.

Figures 3 to 5 of the accompanying drawings which, like the claims, form a part of my application, show various constructional examples of my invention.

Figure 3 shows a circuit arrangement in which the external characteristic is influenced by means of conductor elements.

Figure 4 shows a circuit arrangement which only differs from that according to Figure 3 by the fact that the conductor elements provided are made adjustable.

Figure 5 shows a circuit arrangement in which the external characteristic is influenced by means of control grids.

The rectifier 13 supplying the direct current is connected to the alternating current supply network 12 through the transformer 11.

The device 13, in this example is shown as a mercury vapour rectifier with a cathode 20. It is possible, however, to employ any other suitable device for supplying direct current. The rectifier 13 operates on the direct current circuit 17 to which an inverter 14 is connected in known manner. The said inverter is likewise shown in the form of a mercury vapour discharge vessel with a cathode 22, but it is also possible to employ any other type of rectifier. The inverter is provided with control grids 15, the grid potential of which may be varied by operating the adjusting knob 21 of the control device 16. As is known, the output given by the inverter depends upon the adjustment of the grid potential. The inverter feeds the alternating current network 19 through the transformer 18.

The circuits and the control devices thus described agree with the known constructions, so that persons versed in the art are acquainted with them, and hence a detailed description of the circuit will not be given.

In order now to be able to influence according to the invention the external characteristic of the rectifier 13 feeding the direct current circuit 17, reactances 10, in which during load there occurs a drop in voltage reducing the direct current voltage, are inserted in the alternating current side of the rectifier. The said reactances are so dimensioned and adjusted as to give the desired external characteristic of the rectifier 13.

The operation of the system shown in Figure 3 is as follows: The polyphase transformer 11, having the primary and secondary winding thereof connected to the power supply line 12 and the reactance units 10, respectively energizes the rectifier 13. The output characteristic of this rectifier is adjusted by proportioning the impedance characteristic of the anode to cathode paths, the reactances 10 and the transformer 11 in such a way that the output current and voltage characteristic of the rectifier is defined by the curve 8 of Figure 2. The output current and voltage characteristic of the rectifier is thus adjusted to permit the operation of the inverter, fed by the rectifier, over a wide range of current and voltage values. This is accomplished by adjusting the rectifier output characteristic so that it varies in a predetermined manner as the inverter load characteristic varies.

The output direct current from the rectifier is impressed upon the cathode and anode circuit of the inverter 14. The direct current flows from the cathode 22 to the anodes 14a, 14b and 14c through the primary windings 18a, 18b and 18c of the transformer 18. The direct current from the rectifier 13 is caused to flow through the different windings 18a, 18b and 18c successively, and through the corresponding anode-cathode circuits of the inverter and thus set up alternating potential in the corresponding secondary windings of the transformer. Inasmuch as the alternating current lines 19 operate at a definite frequency the inverter 14 must be adjusted to maintain the alternating current derived therefrom in proper phase and voltage relation with the alternating current transmitted over said lines. This is accomplished by proper commutating action in the inverter by the use of the grid electrodes 15a, 15b and 15c which function to initiate the electric discharge between the cathode and the anodes 14a, 14b and 14c, respectively. When the current flow between anode 15a and the cathode 22 is initiated by impressing the proper potential on the grid 15a, the primary winding 18a is energized and an electromotive force is induced into the secondary winding corresponding thereto. This secondary induced voltage must be sufficient to overcome the line voltage existing in the secondary winding in order that power may be fed to the line 19 from the inverter. The potential of the grid electrode 15a is adjusted to prevent the circuit of the anode 14a from being energized until the winding 18a of the transformer is energized sufficiently to assure the feeding of power from the inverter into the line 19.

After the current flow through the circuit of the anode 14a and primary 18a has been maintained for a predetermined fraction of the alternating current cycle of the line current of the line 19, the output circuit of the anode 14b is energized. Simultaneously the current flow through the output circuit of the anode 14a is interrupted to obtain proper commutating action. The current through the circuit of the anode 14b is started by decreasing the negative potential on the corresponding grid electrode 15b. The potential of the grid electrode 15a is at the same time increased negatively. As a result the anode 14b assumes the load and the anode 14a becomes inactive. The interval during which the anode 14a carries the major part of the load is defined by the interval between $t_1$ and $t_2$ (Figure 1a). At $t_2$ the potential of the grid electrode 15b is changed to a positive value and the potential of grid electrode 15a is changed to a negative value. The shift in load from anode 14a to anode 14b is therefore initiated at $t_2$. The interval between $t_2$ and $t_3$ defines the angle of overlap during which both anodes 14a and 14b carry some of the load current, however, during this interval the anode 14b is assuming the load from the anode 14a and consequently the current through the anode 14b is increasing and that through the anode 14a is decreasing.

At the interval $t_4$ the potential of the grid electrode 15b is changed to a negative value and that of the grid electrode 15c is changed to a positive value while the grid electrode 15a is maintained negative. The anode 14c, therefore, begins to assume the load from the anode 14b at this point. At the interval $t_5$ the potential of the grid electrode 15c is changed to a negative value and the load is shifted from the anode 14c to another anode. In the case of a three anode tank the anode 14a would start to assume the load at this point, however, in a six anode tank the anode connected to the next phase would assume the load.

The operation of the systems shown in Figures 4 and 5 is similar to that of the system illustrated in Figure 3.

In the circuit arrangement according to Figure 4, variable reactances 23 adjustable, by means of sliding contacts, according to the existing working conditions are provided in place of the fixed reactances 10. In other respects, Figure 4 corresponds exactly to Figure 3.

Figure 5 shows a circuit arrangement in which the external characteristic of the rectifier 13 is influenced by means of control grids 25. The grid potential is controlled by means of a control device 26, which is connected to the alternating current network 12 and also, through a shunt 27, to the direct current circuit 17. The construction of these grid control devices are known to persons versed in the art, so that they will not be described in detail here.

It is furthermore possible to influence the external characteristic of the device feeding the direct current circuit by suitably proportioning the no-load voltage of the said device. When a rectifier is employed, therefore, its alternating voltage must be suitably selected.

The essential feature of my invention is solely the fact that the external characteristic of the device feeding the direct current circuit is influenced according to the invention, but not the method and means employed for effecting such influencing. My invention is therefore not to be limited to the constructional examples given in the foregoing.

I claim:

1. In an arrangement for converting direct current into alternating current comprising, a direct current circuit, a discharge device for feeding said direct current circuit, a second discharge device fed by said direct current circuit for converting the direct current supplied into alternating current, an alternating current network on which said second discharge device operates, control grids in said second discharge device, means for varying the potential applied to said control grids, and means for varying the output current and voltage characteristic of said first discharge device for maintaining said second discharge device in operation below the step limit of the latter in at least a part of the possible range of loads between no-load and short circuit.

2. In an arrangement for converting direct current into alternating current comprising, a direct current circuit, an electrical discharge device for feeding the said direct current circuit, a second electrical discharge device fed by the said direct current circuit and adapted to convert the direct current supplied thereto into alternating current, an alternating current network on which the said second electrical discharge device operates, control grids in said second electrical discharge device, means for varying the potential applied to said control grids, and means for varying the output and voltage characteristic of said first electrical discharge device for maintaining said second electrical discharge device in operation, below the step limit of the latter throughout the entire range of load between no-load and short circuit.

3. In an arrangement for converting direct current into alternating current comprising, a direct current circuit, a rectifier for feeding said direct current circuit, an alternating current network connected to said rectifier, an inverter connected to said direct current circuit and adapted to convert the direct current supplied thereto into alternating current, an alternating current network connected to said inverter, control electrodes in said inverter, means for varying the potential applied to said control electrodes, and reactances connected in the alternating current side of said rectifier, the magnitude of said reactances being such that the output current and voltage characteristic of said rectifier extends below the step limit of said inverter in at least a part of the possible range of loads between no-load and short circuit.

4. A safety means for arrangements for converting direct current into alternating current and having a direct current circuit, a source of supply for feeding said direct current circuit, an inverter connected to said direct current circuit for converting the direct current applied thereto into alternating current, an alternating current network coupled to said inverter, control electrodes for said inverter, means for varying the potential applied to said control electrodes, and means for varying the output current and voltage characteristic of said direct current supply source for maintaining said inverter in operation below the step limit thereof in at least a part of the possible range of loads between no-load and short circuit.

5. A method of preventing the falling out of step of a grid control inverter filled with a gaseous medium, connected in circuit for converting direct current into alternating current, which comprises the steps of, energizing a rectifier by an alternating current, rectifying said alternating current into direct current, energizing an inverter with said direct current, converting said direct current into an alternating current, and adjusting the output current and voltage characteristic of said rectifier to maintain said inverter operating below the step limit thereof in at least a part of the possible range of loads between no-load and short circuit.

6. A method of preventing the falling out of step of a grid control inverter filled with a gaseous medium, connected in circuit for converting direct current into alternating current, which comprises the steps of, energizing a rectifier by an alternating current, rectifying said alternating current into direct current, energizing an inverter with said direct current, converting said direct current into an alternating current, adjusting the no-load output voltage of said rectifier, and adjusting the output current and voltage characteristic of said rectifier to maintain said inverter operating below the step limit thereof in at least a part of the possible range of loads between no-load and short circuit.

7. A method of preventing the falling out of step of a grid control inverter filled with a gaseous medium, connected in circuit for converting direct current into alternating current, which comprises the steps of, energizing a rectifier by an alternating current, rectifying said alternating current into direct current, energizing an inverter with said direct current, converting said direct current into an alternating current, and adjusting the potential of the grid electrodes of said rectifier to adjust the output current and voltage characteristic of said rectifier for maintaining said inverter in operation below the step limit thereof in at least a part of the possible range of loads between no-load and short circuit.

WALTER DÄLLENBACH.